United States Patent [19]

Roach

[11] Patent Number: 4,482,365
[45] Date of Patent: Nov. 13, 1984

[54] VORTEX AIR CLEANER AND SELF-CLEANING BARRIER FILTER ASSEMBLY FOR SUPERCHARGED ENGINES

[75] Inventor: Charles J. Roach, Brooklyn, N.Y.
[73] Assignee: Pall Corporation, Glen Cove, N.Y.
[21] Appl. No.: 353,705
[22] Filed: Mar. 1, 1982
[51] Int. Cl.³ .................... B01D 46/04; B01D 46/48; B01D 50/00
[52] U.S. Cl. ........................ 55/218; 55/283; 55/290; 55/303; 55/315; 55/317; 55/343; 55/431; 55/432; 55/468; 55/473
[58] Field of Search ............ 55/283, 303, 315, 290, 55/431, 432, 317, 218, 343, 468, 473, 467

[56] References Cited

U.S. PATENT DOCUMENTS

| | | |
|---|---|---|
| 1,784,278 | 12/1930 | Dollinger .................. 55/283 X |
| 2,795,291 | 6/1957 | Pierce ........................ 55/290 |
| 2,953,248 | 9/1960 | Troland ..................... 55/431 X |
| 3,360,907 | 1/1968 | Clark, Jr. et al. ............ 55/283 |
| 3,402,881 | 9/1968 | Moore et al. ................ 55/283 X |
| 3,486,302 | 12/1969 | Paynter ...................... 55/431 X |
| 3,884,658 | 5/1975 | Roach ........................ 55/315 |
| 4,009,011 | 2/1977 | Ross .......................... 55/283 X |
| 4,345,922 | 8/1982 | Grassel ....................... 55/432 X |

FOREIGN PATENT DOCUMENTS 611283 10/1960 Italy ........................ 55/290

Primary Examiner—Kathleen J. Prunner

[57] ABSTRACT

An air cleaner assembly is provided for supercharged engines including a supercharger compressor, comprising a vortex air cleaner upstream of the supercharger compressor, and a rotatable barrier filter cartridge that is self-cleaning downstream of the supercharger compressor.

15 Claims, 5 Drawing Figures

VORTEX AIR CLEANER AND SELF-CLEANING BARRIER FILTER ASSEMBLY FOR SUPERCHARGED ENGINES

Internal combustion supercharged such as turbocharged as well as naturally aspirated engines require an air cleaner to make sure that the air that is fed to the engine is freed from contaminants that would otherwise damage or deleteriously affect the engine. The usual type of air cleaner for such engines is a dry-type cleaner, including a precleaner followed by a barrier filter. The contaminants removed by the precleaner can be unloaded by a gravity unloader valve, or by induced scavenge, using a blower or an air or exhaust gas ejector. Following the barrier filter, the air passes through the supercharger compressor, and thence through an after-cooler to the engine.

Such systems place a limit on the manifold pressure available according to the pressure drop across the precleaner and filter, and this pressure drop increases as the filter becomes loaded with contaminants that cannot be removed until the system is shut down and the filter is replaced or cleaned. Superchargers are employed to increase the inlet manifold density, thereby increasing the BMEP, Brake Mean Effecitve Pressure, and horsepower. An after-cooler is used to remove the adiabatic heat of compression which if not removed reduces the inlet manifold density. The restriction on manifold pressure also imposes a like restriction on the manifold density, and of course the maximum inlet manifold density and pressure can be obtained only initially, when the filter is clean, since they continually decrease as the filter loads up with contaminants.

U.S. Pat. No. 3,884,658 patented May 20, 1975 to Charles J. Roach, provides an air cleaner assembly having a vortex-type air cleaner upstream of the supercharger compressor, and a barrier filter downstream of the supercharger compressor. The barrier filter, since it is on the hot side of the compressor, is capable of withstanding whatever elevated operating temperature is experienced, within the range from at least 250° up to about 600° F., and higher.

The placing of the barrier filter on the high-pressure side of the supercharger gives an air cleaner system which has a higher dirt capacity, improved high-altitude performance and improved inlet blower performance on two-cycle engines, which can increase horsepower and which can continue to operate at a higher pressure drop across the air cleaner. This makes it possible, for performance characteristics equivalent to a conventional air cleaner system to construct the air cleaner system of the invention to a smaller package volume, or to a smaller after-cooler volume, or to achieve a lower air pumping cost.

The problem with this system, however, is that the barrier filter eventually plugs, requiring cleaning or replacement, and both thereafter and for some time before, the mass (pounds) and pressure of pressurized clean air delivered to the engine are inexorably and greatly reduced.

In accordance with the present invention, an air cleaner-supercharger-compressor assembly for supercharged engines including a supercharger compressor is provided, comprising, in combination, a vortex air cleaner, a supercharger compressor, and a rotatable barrier filter cartridge, each in series fluid flow connection with the other, and each having an inlet and an outlet; the outlet of the air cleaner being in fluid flow connection with the inlet of the supercharger-compressor, the outlet of the supercharger-compressor being in fluid flow connection with the inlet of the barrier filter, and the outlet of the barrier filter being in fluid flow connection with the engine or aftercooler; the air cleaner being disposed upstream of the supercharger compressor, and the barrier filter cartridge being disposed downstream of the supercharger compressor, the barrier filter cartridge being capable of withstanding an elevated operating temperature within the range from at least about 250° F. to about 600° F., and being rotatable at a speed within the range from about 0.05 to 5 revolutions per minute; and an outlet upstream of the barrier filter generating at an upstream surface of the filter an outward backflow of pressurized air through the filter from the downstream side thereof entraining material collected on the upstream surface of the barrier filter cartridge and dumping such material via the outlet during rotation of the filter cartridge and thus inhibit pressure drop across the filter cartridge from exceeding a selected maximum.

Figure 1:
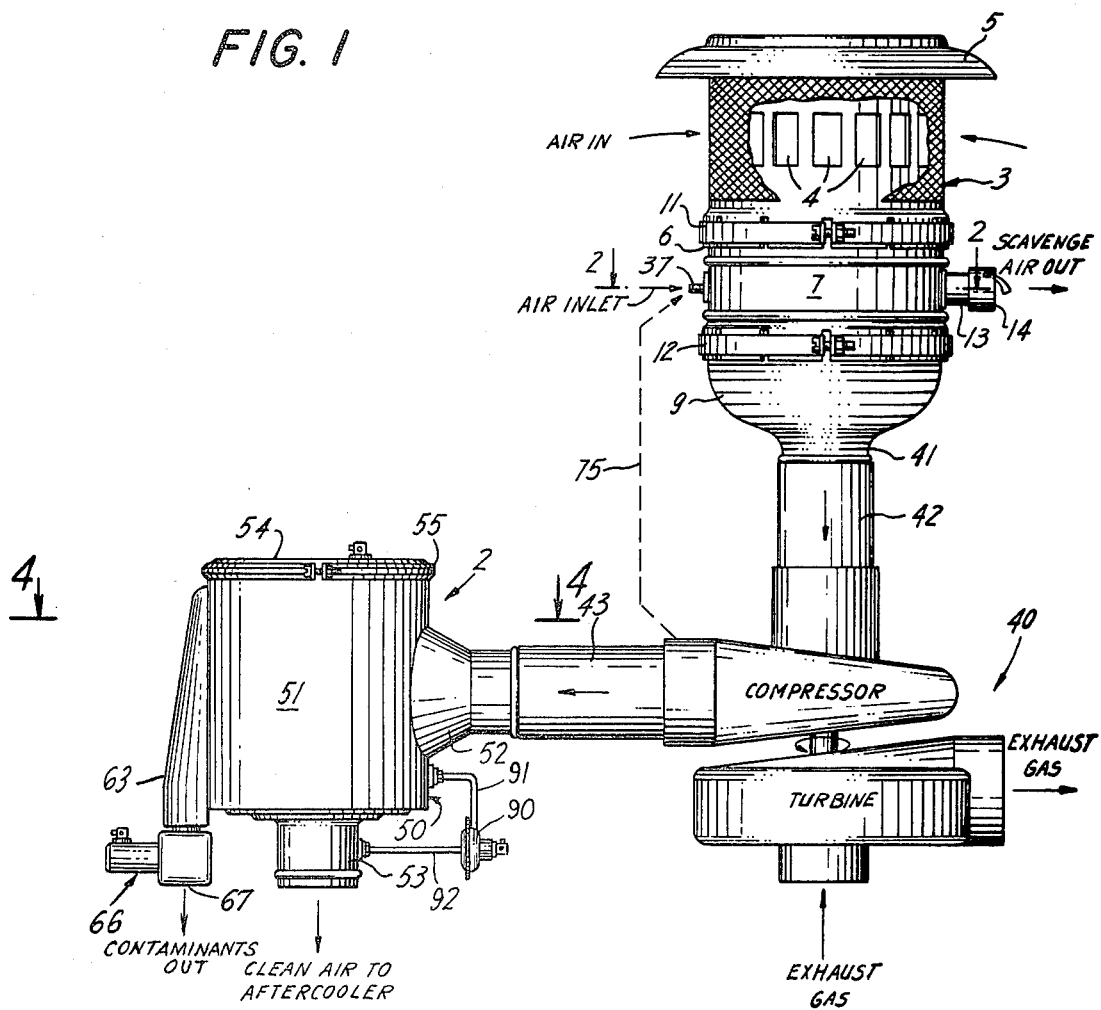
FIG. 1 is a plan view, in elevation, of a supercharger compressor fitted with an air cleaner assembly in accordance with the invention.

The vortex air cleaner component of the air cleaner assembly of the invention comprises one or a plurality of vortex-type air cleaners. A single vortex-type air cleaner can be used, but it is usually preferable to employ an array of such cleaners, as described for example in U.S. Pat. No. 3,520,114, dated July 14, 1970; U.S. Pat. No. 3,590,560, dated July 6, 1971; U.S. Pat. No. 3,611,679, dated Oct. 12, 1971, to David B. Pall et al; and U.S. Pat. No. 3,915,679 dated Oct. 28, 1975 to Charles J. Roach et al. The vortex air cleaner array has a sufficient flow capacity to meet the air supply requirements of the engine in connection with which it is used.

The term "vortex air cleaner" as used herein refers to an air cleaner which comprises a tubular air cleaner body having a central passage with an inlet and an outlet at opposite ends; a vaned deflector adjacent the inlet for creating a vortex stream in the influent air to concentrate any contaminant particles in the air at the periphery of the passage, and clean the air at the center of the passage; and an outlet member having a central clean air passage communicating with the central passage of the tubular body and disposed within the passage at the outlet, the exterior wall of the outlet member defining a generally annular contaminant scavenge passage within the central passage of the tubular body through which pass contaminant particles while relatively clean air at the center of the passage passes through the central clean air passage of the outlet member.

Vortex air cleaners have the advantage that the pressure drop between the inlet and outlet is quite low, and this is coupled with a high cleaning efficiency. Thus, they cause little power loss to the engine. Furthermore, if a scavenge flow of air is employed to sweep contaminant particles from the assembly, efficiencies comparable to those obtained by a cyclone separator can be obtained, and the unit becomes self-cleaning.

Since vortex air cleaners have relatively low pressure drop, and thus cause little power loss to the engine, they are in use in an array of such air cleaners on aircraft wherein the problem of removing dust or dirt from air entering an aircraft engine is particularly acute. The cleaning efficiency insignificantly decreases and the pressure drop significantly decreases relatively, if a plurality of vortex air cleaners are used together, in parallel, in an array.

The term "vortex air cleaner array" as used herein refers to an assembly of vortex air cleaners mounted together as a unit, with their axes aligned in parallel, or a group of such assemblies. The vortex air cleaners are normally supported between a pair of plates which hold the bodies of the vortex air cleaners with their dirty air inlets and clean air outlets in an exposed position beyond the plates. The scavenge passages for dirty air from the vortex air cleaners empty into a common scavenge chamber, which is normally defined between the support plates. A scavenge port is provided in a wall of the scavenge chamber, for the removal of dirty air laden with contaminant particles.

The tubular body of the vortex air cleaner can be substantially cylindrical, and of uniform diameter from the inlet to the outlet. However, improved separation and reduced pressure drop across the body can be obtained if the tubular body is tapered from the outlet to the inlet for at least a portion of its length, such that the outlet is of greater diameter than the inlet. This produces a widening air flow column therethrough.

The tube can be tapered along its entire length from the outlet to the inlet, thus assuming a slightly conical shape. In this construction, the vaned deflector would also be tapered, and somewhat conical in shape, to match the taper of the tubular body. The tubular body can also be tapered for only a portion of its length. For example, the tubular body could be substantially cylindrical for approximately the length of the vaned deflector, and the outward taper or flaring of the body can begin at a point immediately adjacent the downstream end of the deflector, and continue to the outlet.

The cone angle of the taper should be within the range of up to about 10°, and preferably is less than 3°. The tapered portion can be straight-sided or curved smoothly within these angle limits. The cone angle as used here is the angle between the two sides of the cone, and is thus twice the angle from one side, or the tangent thereto is curved, to the axis. The taper of the tubular body and the widening of the diameter of the columnar flow as described above improve the efficiency of separation, and reduce the pressure drop across the assembly.

The tubular body is preferably made by molding it from abrasion-resistant plastics, such as nylon, polyurethanes, polypropylene, polycarbonate, and polyphenylene oxide. Metals such as steel, stainless steel, nickel alloys and the like can also be used.

The vaned deflector for generating a vortex stream in the influent air is fixed in the tubular body at the inlet of the tube. The vaned deflector is adapted to generate a vortex stream into the air to throw contaminant particles to the periphery of the body, and ensure that they hit or closely approach the wall of the body before they reach the outlet.

The deflector is designed to impart sufficient force to the vortex stream for a given influent flow to attain this result. The deflector can be bonded in place in the tubular body or pressfitted into position, or integrally molded with the tubular body.

The deflector should be relatively long, and the vanes should occupy approximately one-half the effective length of the tube. However, it should not be so long that the pressure drop across the assembly is too high, and poor separation results.

The deflector can be composed of about three to six helical vanes, which are supported at their centers preferably on a central hub. Four vanes are preferred. The vanes, if desired, can be tapered in thickness from front to back to reduce the pressure drop across the assembly.

The helix angle and the pitch length of the vanes should be selected such that there is zero daylight from front to back of the deflector, so that influent particles cannot pass through the separator without being deflected from a straightthrough course.

The deflector preferably has a blunt tip at the upstream end, which protrudes beyond the vanes of the deflector for a distance of approximately 0.25 inch. This blunt tip is preferably a cylindrical rod, which is an extension of the hub and which has a flat end portion. A domed end can also be used. These configurations assist in guiding air toward the vanes of the deflector without increasing turbulence in the flow, and improve the efficiency of separation without adding to the pressure drop across the unit.

An upstream tip also can provide support for a guard screen across the inlet of the tubular body.

The downstream end of the deflector is provided with a rearwardly projecting conical tip, which extends beyond the vanes. This conical tip aids in creating the vortex stream by preventing turbulence in the air leaving the deflector, thereby improving the efficiency of separation. The conical tip should be formed to a cone angle of between 30° and 60° and preferably 36° and 50°. If the conical tip is formed to these angles, it will not add to the pressure drop across the vortex tube and efficiency will be increased. The cone angle as used here is the angle between the two sides of the cone and is thus twice the angle from one side to the axis.

The deflector can be made of the same or of different material from the tubular body. Abrasion-resistant long-wearing materials, such as nylon, polyurethanes, polypropylene, and polycarbonates, as well as metals such as steel, stainless steel, nickel alloys, and the like, are preferred.

An outlet member is provided at the outlet end of the tubular body. This outlet member is generally tubular and is preferably frustoconical in shape. At the upstream end it is smaller in diameter than the tubular body, and this end extends into the outlet of the tubular body. The outlet member defines an annular space between itself and the tubular body at the periphery of the tube through which the dirt particles are removed. The central passage of the outlet tube is located at the center of the tubular body, and clean air is drawn from the assembly through the center of the outlet.

The outlet member should extend into the outlet end of the tubular body for a distance that is equal to from about 0.10 to about 0.25 times the diameter of the tube.

The outlet member can be supported in position by tabs, which can be formed on the outlet member and extend to the separator body; it can also be supported by a back plate.

When the vortex air cleaner tubes are grouped in an array, one back plate can be employed to support the outlets of many tubular bodies.

It is also possible to provide a conically shaped lip on the end of the outlet member that is within the tubular body. This conically shaped lip can be used to align the outlet members in the body, and can form a baffle to direct the dirt particles to the periphery of the tubular body for discharge. The conical lip can touch the tubular body at one point, and thus align the outlet member in the tubular body.

The cone angle used for the lip is preferably 32°, but any angle within the range of 20° to 40° is suitable.

The ratio of the outside diameter of the outlet tube to the inside diameter of the tubular body at the point where the outlet is located can be within the range from about 0.60 to about 0.97 inch.

Any means can be provided to remove particles from the assembly, such as a blower, leading to an orifice from the scavenge chamber which utilizes positive system pressure upstream of the air cleaner, to blow particles out the orifice, or a compressor or blower or ejector to discharge contaminants from the scavenge chamber. An eductor or ejector is preferred. Scavenge flow can also be supplied using the supercharger compressed air to power an air ejector or eductor.

The rotatable barrier filter cartridge is of a material which can withstand whatever elevated operating temperature is to be experienced, within the range from at least 250° F. up to about 600° F.

Metal filters of high-melting metals such as aluminum, copper, iron, cobalt, nickel, palladium, tantalum and zinc, and high-melting alloys such as aluminum-copper, stainless steel, nickel-chromium, bronze, nickel-chromium-iron, niclel-iron-molybdenum, copper-manganese, and copper-nickel alloys are preferred; for example: wire mesh, perforated metal plates, sintered porous stainless steel, as disclosed in U.S. Pat. No. 2,554,343, dated May 22, 1951, to David B. Pall; rolled wire mesh, as disclosed in U.S. Pat. No. 2,423,547, dated July 8, 1947, to Behlen; sintered wire mesh, as disclosed in U.S. Pat. Nos. 2,925,650 and 3,049,796 to David B. Pall; and knitted wire mesh disclosed in British Pat. No. 1,268,446, published Mar. 29, 1972, to David B. Pall.

It is also possible to fabricate the filters from high-melting synthetic polymers, such as glass-reinforced polyethylene and polyvinyl chloride, polycarbonates, polystyrene, polyoxy methylene, polystyrene-acrylonitrile, polyacetal, acrylonitrile rubbers, fluorocarbon rubbers, polyphenylene oxide, polysulfones, acrylonitrile-butadiene-styrene polymers, and polyimides.

The filter also can be a paper sheet, made of cellulose fibers, intermixed if desired with synthetic fibers, such as glass, quartz, potassium titanate, and like high-melting fibers, or a woven or nonwoven fibrous material of such fibers, such as glass cloth or glass bats and mats. The sheet can be resin-impregnated to increase strength, such as epoxy resin-polytetrafluoroethylene and silicone resin-impregnated paper.

The barrier filter cartridge can be composed of a single filter element or of a plurality of juxtaposed filter elements of the same or different characteristics. One can supplement the other, such that the first element removes only large particles, and the subsequent element all particles above a smaller minimum size passing through the first element. The elements can be of the same pore size, in which event the second is a reserve or backup element coming into service in case of rupture or blocking of the first element, improper installation, or installation damage. When there are two filter elements in series to each other, the first is referred to as the primary filter element, and the second as the secondary filter element.

The primary filter element is selected to meet the system requirements for incident particle removal. Some systems may require the removal of all incident particles as small as 1 micron in diameter. However, the primary filter element can remove a proportion of even smaller particles, down to 0.05 micron in diameter, or all of such particles, if required, or only considerably larger particles, if removal of such a high proportion of small particles is unnecessary. There is no upper limit, but filters having the ability to remove all particles of from 1 to 300 microns are generally useful.

It is preferred to form the primary filter element in pleats, convolutions or corrugations, so as to provide a greater surface area in a small volume.

The secondary filter element is selected for flow capacity, so as to pass the required volume of gas per unit time under the maximum flow demands of the system, and is preferably also selected so as to give the lowest incident particle removal ratings obtainable at such flow capacity.

The particle removal capability of the secondary filter element is in no way critical, and the pore opening can range from 1 to 300 microns or higher, depending on the system parameters. Any of the materials described above for use in the primary filter element can also be employed for the secondary filter element, but with a larger pore diameter so as to have a higher micron removal rating, for the required greater flow capacity.

The secondary filter element also preferably is formed in pleats, convolutions or corrugations, for greater surface area.

The filter cartridge can be in any tubular configuration. A side seam seal and an end cap appropriate to the configuration of the tubular filter cartridge is of course employed in each case. Normally, the filter cartridges are in cylindrical corrugated form, but the tubular cartridges can be in any cross-sectional configuration, including plain, folded, convoluted and corrugated triangular, square, rectangular, elliptical and other polygonal filter tubes. The size and configuration of the convolutions in the case of a corrugated element are not critical, and any metallic or thermoplastic resinous material can be employed for the side seam seal and the end caps that is capable of withstanding the elevated temperatures to which the barrier filters may be subjected.

The tubular filter cartridges may be made of from one, two, three, four, five or more layers of the same or different filter materials. If the material has insufficient rigidity to be self-supporting, the tube can be made so by incorporation of a central core or support, such as a spring or a supporting tube of rigid metallic or plastic material, for instance, a perforated metal or plastic foraminous core or spring of conventional construction. External sheath supports can also be applied. Any internal and/or external support is normally of a length substantially equal to that of the filter cartridge, so that the support and the edges of the filter cartridge are in a substantially flush fit with the end caps, when they are bonded thereto. The end caps can be made with appropriate raised or depressed portions and apertures to meet the shape and flow requirements of the ends of the filter support, and the folds are convolutions of the filter tube, and in accordance with the flow requirements and structural requirements of the filter assembly in which the filter element is to be used.

The barrier filter cartridge is mounted for rotation so as to allow contaminants filtered out of the fluid to be blown off by backflow through the filter. One convenient arrangement mounts the cartridge on the rotor or rotor shaft of an electric motor. The motor then rotates the cartridge in a direct drive. This arrangement is shown in the drawings. If it is not practical to attach the motor in juxtaposition to the cartridge, for space or temperature reasons, an indirect chain or gear drive can be used; or the motor located outside of the gas space with the drive thermally isolated. Instead of an electric motor, an air motor or hydraulic motor, mechanical drive from the engine, or turbine driven by a stream of the available pressurized air can be used.

Backflow through the filter from the downstream side of the filter is generated by establishing a zone of differential pressure at a selected portion of the filter cartridge upstream surface. The high fluid pressure downstream of the filter is utilized as the source of backflow by bringing a portion of the upstream surface of the filter into close proximity with a source of relatively low fluid pressure, such as atmospheric pressure outside of the system. The backflow generated under a sufficient pressure drop across the filter element is sufficient to unload and entrain therein part or all of the contaminant load collected on the upstream surface of the filter, and the backflow is so directed as to carry these contaminants to and through the outlet where the load is dumped.

Rotation of the filter makes it possible to define a zone of differential pressure in a relatively small area, so as to expose only a small poriton of the upstream filter surface at a time to this backflow pressure differential, while leaving the major portion still available for filtered flow. In this way, unloading can continue, continuously or intermittently, while the filter is still onstream. The zone of differential pressure can extend or be applied lengthwise of the filter surface along a line parallel to the longitudinal axis of the cartridge, from one end cap to the other, and this is usually the most convenient, restricted to a narrow band, corresponding, for example, to approximately 1/500th to 1/10th the total surface area in a noncorrugated or corrugated filter cartridge. This would usually be the span of one or two corrugations of a corrugated filter cartridge. However, it is also possible to apply the zone of reduced pressure to the filter surface along a line running at an angle to the longitudinal axis of the filter, corresponding to a helical or spiral path in the case of a cylindrical filter cartridge, in order to better distribute along the cartridge any outward mechanical stress upon the filter surface arising from the internal high fluid pressure.

One way of defining and applying a zone of differential pressure is by means of a longitudinal trough extending along one wall of the filter chamber, from end to end of the filter cartridge. One embodiment of trough is shown in the drawings. The open side of the trough facing the filter surface is of a span corresponding to the dimensions of the zone of differential pressure to be applied to the filter. The walls of the trough can be convergent towards the filter chamber wall and towards the outlet, so as to increase the rate of flow of the stream carrying the entrained contaminants, and thus aid in propelling them along the conduit to the outlet for dumping without danger of deposition along the conduit and trough. The walls of the filter chamber are provided with a plurality of apertures along the base of the trough.

The clearance between the walls of the trough and the filter surface should be rather small, of the order of from about 0.001 to about 0.1 inch. This will allow only a small flow from the upstream surface of the filter outside the trough through the gap into the trough, thus causing the desired amount of air to flow from the downstream side through the filter cartridge, which flow will effectively unload and entrain therein part or all of the contaminant load collected on the upstream surface of the filter.

A labyrinth seal can be imposed between the trough side ends and the filter surface, to restrict such flow as much as possible, if desired.

Instead of a trough, the wall of the filter chamber can be shaped with a protruding or ridge portion, open at the peak of the ridge, with the ridge extending into close proximity with the filter surface, and having an open area corresponding to the desired zone of differential pressure, such as the span of one filter corrugation, in the case of a longitudinally corrugated filter. It is also possible to utilize a plurality of tubes laid out along the zone of differential pressure. Other variations will be apparent from this description.

The contaminants unloaded from the rotating barrier filter cartridge and entrained in the backflow are discharged using a scavenge flow of pressurized air, as in the case of the vortex air cleaner array. The scavenge flow can be controlled by a variable orifice, fixed orifice or narrow slots; or combination of orifices and narrow slots.

The filter cartridge can be rotated continuously, so as to continuously discharge contaminants, and avoid a build-up with accompanying reduced mass flow and pressure drop downstream. While continuous rotation requires a constant bleed of from 0.5% to 5% of the compressed air flow, this is offset by the elimination of the mass flow and pressure loss that gradually increases with contaminant build-up; thus the BMEP (brake mean effective pressure), which is proportional to developed horsepower, does not gradually decrease as occurs with contaminant build-up.

The filter cartridge can also be operated intermittently as required by pressure drop increase due to contaminant build-up. Such operation can be controlled by pressure gauge observation by an operator, or automatically, by a solenoid or other type of valve actuated at a predetermined pressure drop across the barrier filter, sensed by a differential pressure transducer or electric switch.

The turbocharger compressor is of conventional type. A turbocharger compressor is directly shafted to the turbine component which is gas-operated to provide the rotational power needed to drive the compressor. The compressor component includes a vaned rotor which increases air pressure and density. The turbine can be driven by exhaust gases from the engine, and the rotational speed it imparts to the rotor controls the pressure and density of the turbocharged gaseous effluent. An aftercooler can be included to remove the heat of compression of the gaseous effluent. Turbocharger compressors are available for diesel, and fuel-injected and carburetted spark-ignition engines, and the air cleaner assemblies of the invention are useful with all three types of engines: or any type of compressed fluid process system from cryogenic temperatures to 600° F. and higher.

Figure 2:
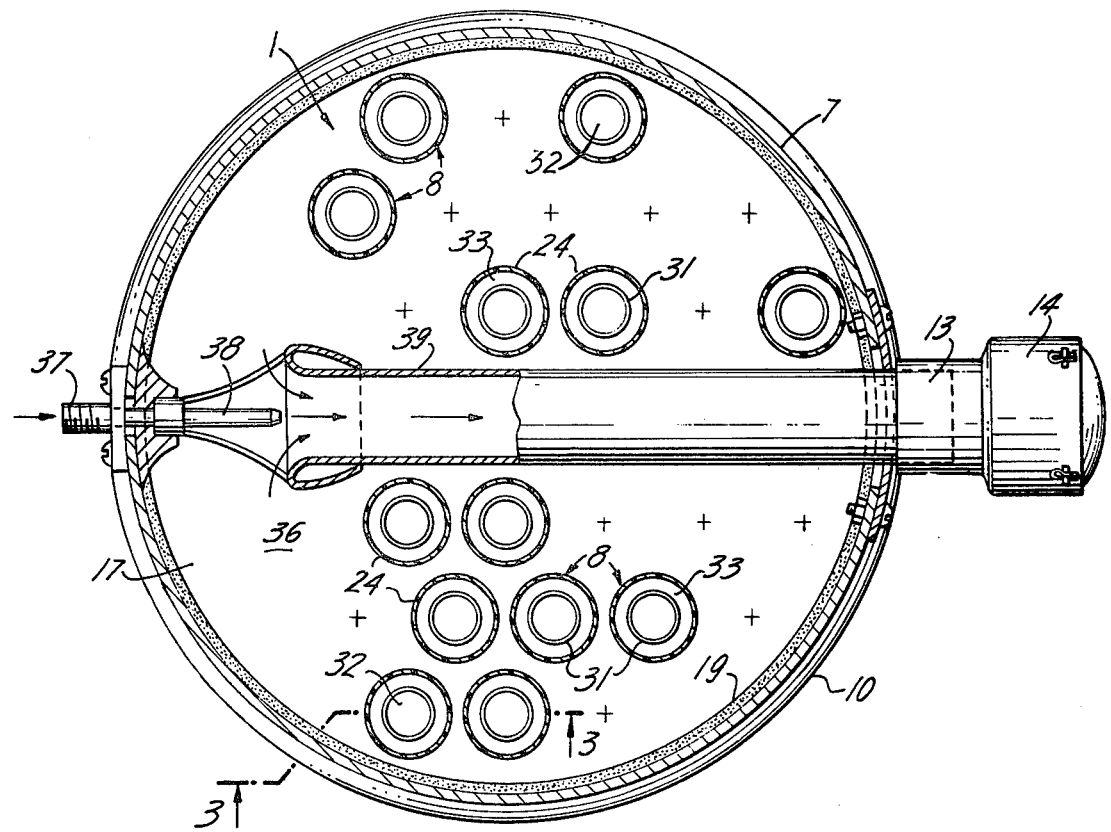
FIG. 2 is a cross-sectional view of the vortex air cleaner component of the air cleaner assembly of FIG. 1, taken along the line 2—2 and looking in the direction of the arrows.
Figure 3:
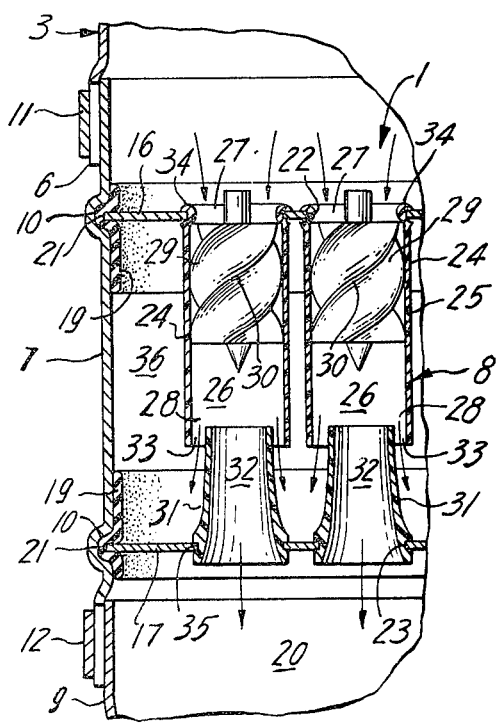
FIG. 3 is a longitudinal section through the vortex air cleaner component, taken along line 3—3 of FIG. 2, and looking in the direction of the arrows.
Figure 4:
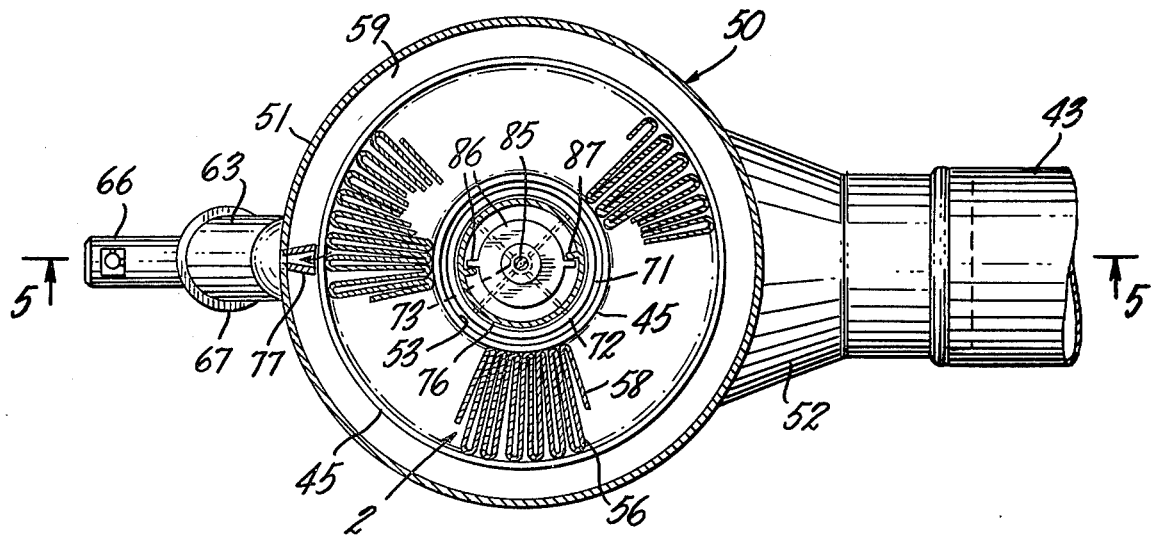
FIG. 4 is a cross-sectional view of the rotatable barrier filter cartridge of the air cleaner assembly of FIG. 1, taken along the line 4—4, and looking in the direction of the arrows.
Figure 5:
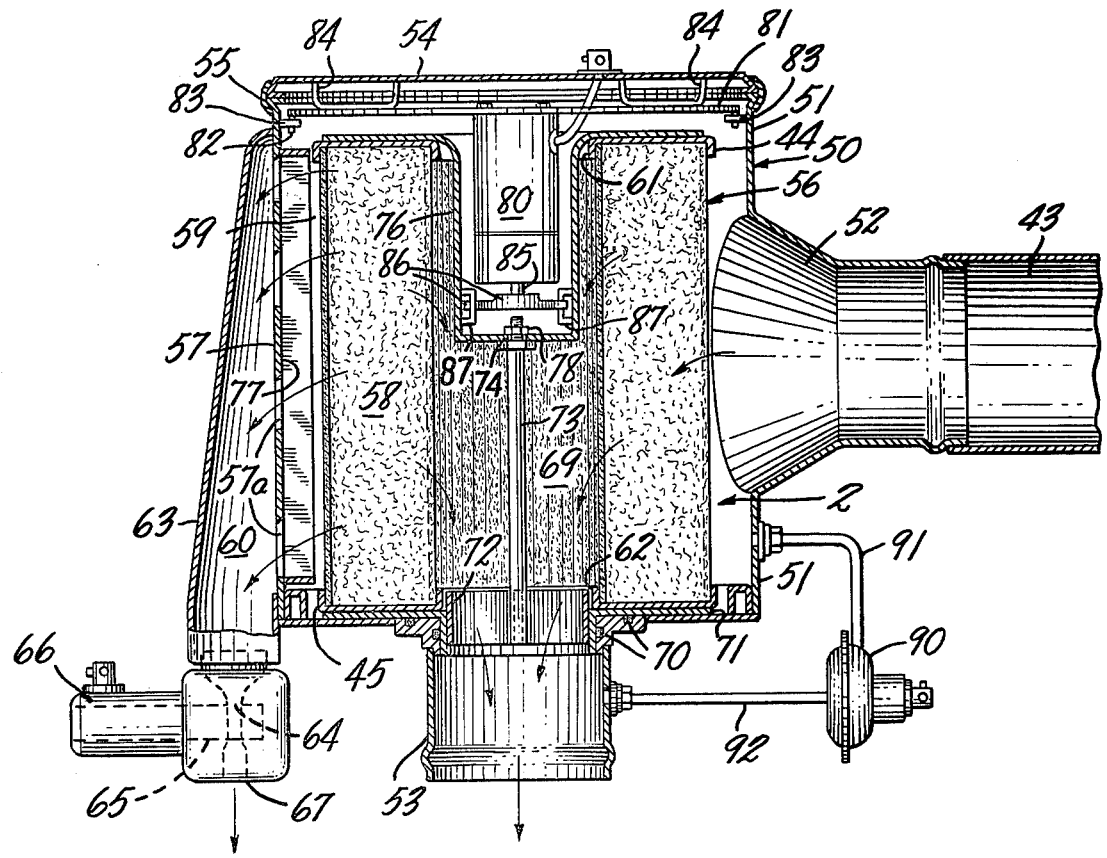
FIG. 5 is a longitudinal section through the rotatable barrier filter cartridge, taken along the line 5—5 of FIG. 4 and looking in the direction of the arrows.

The air cleaner assembly shown in FIGS. 1 to 5 is composed of an array 1 of vortex-type air cleaners arranged in parallel, and a rotatable barrier filter cartridge 2, connected in series, upstream and downstream, respectively, of the supercharger compressor, in this case a turbocharger compressor 40.

The cylindrical housing 3 has an array of inlet ports 4. One end of the cylinder 3 is closed off by the hooded cap 5. The other end 6 of the cylinder is castellated, and flared slightly outwardly to fit over one end of a concentric inner cylinder 7, which carries the array 1 of vortex air cleaners 8. The other end of cylinder 7 is castellated and fits over the bottom cap 9 which leads to the line connection 42 to the turbocharger compressor 40. The cylinder 3 is held to cylinder 7 by the ring 11, which fits over the outside of the cylinder 3, and the cylinder 7 to the cap 9 by the ring 12, which fits over the outside of cylinder 7 at the cap 9.

The cylinder 7 has an outlet or scavenge port 13 through which dirt-carrying scavenge air from the peripheral outlets of the vortex air cleaners 8 can be withdrawn via check valve 14. The check valve prevents backflow at low engine speeds through port 13 into the scavenge chamber, or in case of a break in a line.

The array 1 of vortex air cleaners 8 has the individual cleaners 8 supported between support plate 16 and support plate 17 held in spaced relation in cylindrical housing portion 7 within the castellated portion. The support plates 16 and 17 are shock-mounted to the housing 7 by rubber liners 19 disposed within channels 10 formed on the housing. The peripheries 21 of the plates 16 and 17 are flared, and embedded in these liners.

The support plates 16 and 17 are formed with a plurality of apertures 22 and 23, each of which accommodates an air cleaner tube 24, or outlet member 31. Each air cleaner tube 24 comprises a tubular body 25 having a central passage 26, an inlet 27, and an outlet 28. A vaned deflector 29 is disposed within the central passage 26 adjacent the inlet 27. The tubular body 25 is made of polypropylene.

The deflector 29 is also made of polypropylene, and is integrally molded with the tubular body 25. The vanes 30 of the deflector are helical.

A generally tapered tubular outlet member 31 is disposed with one end extending into the outlet 28 of the passage 26. The outlet member 31 has a central open passage 32 therethrough for the removal of clean air. The outlet member 31 defines an annular passage 33 within the tubular body 25 at the periphery of the tube 24, for the removal of air laden with dirt particles.

The peripheries of apertures 22 on the support plate 16 engage a flange 34 at the inlet 27 of the tubular body 25 of each vortex air cleaner 8. The peripheries of apertures 23 in the plate 17 snugly nest in a groove 35 on the outlet member 31 of each cleaner tube 24. The space 36 defines a scavenge chamber between the support plates 16 and 17, which communicates with the annular dirt scavenge passage 33 of each vortex air cleaner.

The scavenge chamber 36 has an air inlet 37 provided with a nozzle 38 leading a high pressure jet air flow from a compressor (not shown) into the open end of an ejector 39, whose other end connects with outlet 13 and check valve 14, for driving dirt-laden air in the chamber 36 through the outlet. The check valve 14 controls flow through the port 13 in the outgoing direction.

The central passages 32 of the outlet members 31 open on the other side of plate 17, into chamber 20 in the cap 9. The clean air from passages 32 of the outlet members is drawn off from space 20 through the outlet 41 at the narrow end of the cap 9, and can then pass through the line 42 to the turbocharger compressor 40.

The rotatable barrier filter cartridge 2 is arranged in series on the downstream side of the turbocharger 40, at the outlet end of line 43 from the turbocharger compressor 40. The barrier filter 2 has a cylindrical corrugated filter element 56 concentrically disposed within a cylindrical housing 50.

The housing 50 is composed of a bowl 51, with an inlet port 52 connected to line 43, and an outlet port 53 connected to the aftercooler or inlet manifold (not shown). The open end of the bowl 50 is closed by the cap 54, held thereto by ring 55.

The corrugated cylindrical filter element 56 has a filter sheet 58 made of heat-resistant filter material, in this case epoxy resin-impregnated glass sheet, average pore size 1 micron. The open ends of the filter sheet cylinder are closed off by end caps 44, 45. The end cap 45 has a central aperture 62, and the end cap 44 has a hub 76 fixedly attached and extending into a central aperture 61. The hub 76 has two drive lugs 87.

One wall 57 of the bowl 51 has a trough 77 disposed and closely spaced to both end caps 44 and 45, and outside diameter of filter element 56. The trough is placed with walls convergent towards the plurality of apertures 57a, in wall 57, which open into a chamber 60 of the scavenge housing 63. The chamber is in flow connection via orifice 64 and passage 65 past the solenoid shut-off valve 66 to exit port 67, which vents chamber 60 (and bowl 51) to the atmosphere.

At the bottom of bowl 51 and fitted in the wall of the outlet port 53 are dynamic seals 70, which rotatably support the mounting ring 71 on which is carried, for rotation therewith, the end cap 45 and thus the barrier filter cartridge 56.

Fixedly attached to the ring 71 is an annular spider 72, mounted upon one end of a spindle 73, whose threaded other end is fixedly held in aperture 74 (by the lock nut 78) of the hub 76. The spider 72 passes through the aperture 62 of the end cap 45, and the hub 76 passes through the aperture 61 of end cap 44, terminating in a laterally-extending portion that is affixed to the outer surface of end cap 44. The threaded connection via spindle 73 between the hub 76 and ring 71 firmly grip the barrier filter cartridge 2, hold it in place in a manner that permits removal and replacement when necessary, and also secure it for rotation with the ring 71 and hub 76.

The drive for such rotation is provided by an electric motor 80, attached to torque restraining support 81 which is carried by three pins 82 in the apertures of three lugs 83 fixed to the bowl 51. An annular inwardly-extending ridge 84 engages the support 81, and prevents it from rising above the tops of the pins 82 and so detaching in event of an engine backfire. The rotor 85 of the motor carries a drive arm 86 to engage and center drive lugs 87 at the interior of the hub in slots that ensure rotation of hub 76 with the rotor, and with it spindle 73 and spider 72, ring 71, and filter cartridge 2.

The motor is readily removed for servicing it and the filter 2 simply by detaching ring 55 and cap 54 with the attached support 81 and motor 80 from the bowl 51.

This gives access to the filter 2, which upon detachment of the nut 78 from the spindle 73, the filter cartridge 2 can be lifted off and be replaced, cleaned or serviced.

The solenoid valve 66 opens and closes the passage 65, and is actuated according to differential pressure across the filter element 56. Such differential pressure is sensed by the differential pressure switch 90. Pressure upstream of the filter 56 in bowl 51 is communicated to switch 90 via passage 91. Pressure downstream of the filter 56 at the outlet 53 is sensed via passage 92. Whenever the differential pressure therebetween reaches a predetermined value, the switch actuates, signalling the valve 66 to open the passage 65 and vent 67, and also starts the motor 80 so that rotation of the filter begins, unloading collected filter contaminants in the backflow generated through the band of filter surface facing the trough 77. A small scavenge flow, controlled by orifice 64, carries the air-entrained unloaded contaminants out through apertures 57a into chamber 60, then past the orifice 64 through passage 65 and out port 67, dumping the load.

The solenoid valve 66 can be omitted and the passage 65 and port 67 left constantly open, with the motor 80 on continuously, for a continuous unloading of the filter 2, avoiding any drop in pressure and mass flow due to contaminant build-up on the filter.

In operation, air passes through the ports 4 in the housing 3, and then into the inlet openings 27 of the vortex air cleaners 8, where a whirling vortex is formed by the vaned deflector 29, and the dirt is flung by centrifugal force toward the periphery of the central tube passage 26. The outlet member 31 separates the whirling air into a peripheral component and a core component. The peripheral air component laden with dirt emerges by way of the annular passage 33 between the outlet tube 31 and the tubular body 25 of each air cleaner 8, into scavenge chamber 36, and is driven into the open end of ejector 39, and down the ejector to and through the scavenge port 13, whence it escapes from the housing 7. The relatively clean air at the core of each air cleaner 8 is drawn off through the central passage 32 of the outlet tube 31 and the apertures 23 of the plate 17, entering the chamber 20, where it is withdrawn through the outlet 41 of the cap 9. The clean air then passes through the line 42 to the turbocharger compressor 40, and thence through the line 43 to the inlet port 52 of the barrier filter bowl 51. It then enters the annular space 59 between the inside of the bowl 51 and the exterior of the filter element 56, passes through the filter sheet 58 into the space 69 on the interior of the filter element, and finally emerges from the bowl 51 through the outlet port 53, whence it passes to the aftercooler or inlet manifold (not shown).

Whenever the motor 80 is on, and the filter 2 is rotated, with the valve 66 open, contaminants are unloaded from the filter 2 and carried by the scavenge air backflow through apertures 57a, orifice 64, and passage 65, whence they are dumped overboard at port 67.

The scavenge flow for the inertial air cleaner array and for dumping the filtered material thrown off from the rotatable barrier filter cartridge also can be provided by way of the turbocharger. A small proportion of the turbocharged highpressure air emerging from the compressor side of the turbocharger compressor via line 43 can be fed via nozzle 38 into the ejector 39 by way of the line 75, shown in dashed lines in FIG. 1. Scavenge flow also can be induced using an exhaust gas ejector, electric, hydraulic or mechanically driven blower, if desired.

Having regard to the foregoing disclosure, the following is claimed as the inventive and patentable embodiments thereof:

1. An air cleaner-supercharger-compressor assembly for supercharged engines including a supercharger compressor, comprising, in combination, a vortex air cleaner, a supercharger compressor, and a rotatable barrier filter cartridge, each in series fluid flow connection with the other, and each having an upstream inlet and a downstream outlet; the outlet of the air cleaner being in fluid flow connection with the inlet of the supercharger compressor, the outlet of the supercharger-compressor being in fluid flow connection with the inlet of the barrier filter cartridge; and the outlet of the barrier filter cartridge being disposed downstream of the said cartridge for fluid flow connection with an engine; the barrier filter cartridge being mounted for rotation and made of material capable of withstanding an elevated operating temperature within the range from at least about 250° F. to about 600° F.; means for rotating the barrier filter cartridge at a speed within the range from about 0.05 to 5 revolutions per minute; the barrier filter cartridge having in addition to the outlet downstream of the filter cartridge an upstream outlet upstream of the filter cartridge in fluid flow communication with a source of relatively low fluid pressure, less than that prevailing at an upstream surface of the barrier filter cartridge; means defining, and restricting fluid flow from the supercharger compressor into, a zone of differential fluid pressure in close proximity to a portion of the upstream barrier filter cartridge surface within the zone for generating at said upstream surface an outward backflow of pressurized fluid through the barrier filter cartridge from downstream thereof entraining material collected on the upstream surface of the barrier filter cartridge within the zone and dumping such material via the upstream outlet during rotation of the filter cartridge and thus inhibit pressure drop across the filter cartridge from exceeding a selected maximum; a solenoid valve in the upstream outlet to open and close the upstream outlet; and a differential pressure switch in operative actuating relation to the solenoid valve, sensing differential pressure across the barrier filter cartridge, and actuating the valve to open the upstream outlet whenever such differential pressure reaches a predetermined value.

2. An air cleaner-supercharger-compressor assembly according to claim 1, in which the vortex air cleaner comprises a tubular air cleaner body having a central passage with an air inlet and an air outlet at opposite ends; a vaned deflector adjacent the inlet for creating a vortex stream in air passing therethrough to concentrate any contaminant particles in the air at the periphery of the passage, and leave clean air at the center of the passage; and an outlet member having a central clean air passage communicating with the central passage of the tubular body and disposed within the passage at the outlet, the outlet member defining a generally annular contaminant scavenge passage within the central passage of the tubular body through which pass contaminant particles while relatively clean air at the center of the passage passes through the central clean air passage of the outlet member.

3. An air cleaner-supercharger-compressor assembly according to claim 2, comprising an array of vortex air cleaners mounted in parallel between a pair of supports which hold the tubular bodies of the vortex air cleaners with their air inlets and air outlets opening beyond the supports, and having their scavenge passages emptying into a scavenge chamber defined between the supports, and a scavenge port in a wall of the scavenge chamber for the removal of air laden with contaminant particles.

4. An air cleaner-supercharger-compressor assembly according to claim 3, in which the scavenge chamber includes an eductor or ejector in fluid flow communication with the scavenge port for driving air laden with contaminant particles to and through the scavenge port.

5. An air cleaner-supercharger-compressor assembly according to claim 1, in which the barrier filter cartridge has a pore opening within the range from 1 to 300 microns.

6. An air cleaner-supercharger-compressor assembly according to claim 1, in which the outlet upstream of the barrier filter cartridge includes an orifice for control of the outward flow of pressurized fluid.

7. An air cleaner-supercharger-compressor assembly according to claim 1, which includes an electric motor having a rotor rotated thereby in operative connection with the barrier filter cartridge for rotating the barrier filter cartridge, the differential pressure switch being in operative relation to turn the motor on and off and also turning on the motor whenever such differential pressure reaches said predetermined value.

8. An air cleaner-supercharger-compressor assembly according to claim 7 wherein the filter cartridge has an open interior and the motor is nested in one end of the open interior.

9. A self-cleaning barrier filter assembly for use in pressurized fluid systems from which a filter-unloading flow can be dumped, comprising, in combination, a filter housing having an upstream inlet for unfiltered fluid, a downstream outlet for filtered fluid and an upstream outlet for filter-unloading dump flow; and disposed across the line of flow between the unfiltered upstream fluid inlet and downstream filtered fluid outlet a rotatable barrier filter cartridge, the barrier filter cartridge being made of material capable of withstanding an elevated operating temperature within the range from at least about 250° F. to about 600° F., and being mounted in the assembly for rotation; means in the housing for rotating the barrier filter cartridge at a speed within the range from about 0.05 to 5 revolutions per minute; and means in the housing upstream of the barrier filter cartridge in communication with an upstream surface of the barrier filter cartridge and defining, and restricting fluid flow into, a zone of differential fluid pressure in close proximity to a portion of the upstream barrier filter cartridge surface for generating at the upstream barrier filter cartridge surface within the zone an outward backflow of pressurized fluid through the barrier filter cartridge from downstream thereof entraining material collected on the upstream surface of the barrier filter cartridge and dumping such material via the means and the upstream dump flow outlet during rotation of the barrier filter cartridge and thus inhibit pressure drop across the barrier filter cartridge from exceeding a selected maximum; the upstream dump flow outlet including a solenoid valve opening and closing the outlet and a differential pressure switch in operative actuating relation to the solenoid valve, sensing differential pressure across the barrier filter cartridge and actuating the valve to open the outlet whenever such differential pressure reaches a predetermined value.

10. A self-cleaning barrier filter assembly according to claim 9, in which the barrier filter cartridge has a pore opening within the range from 1 to 300 microns.

11. A self-cleaning barrier filter assembly according to claim 9, in which the dump flow outlet upstream of the barrier filter cartridge includes an orifice for control of the outward backflow entraining unloaded material.

12. A self-cleaning barrier filter assembly according to claim 9, which includes an electric motor having a rotor rotated thereby in operative connection with the barrier filter cartridge for rotating the filter cartridge, the differential pressure switch being in operative relation to turn the motor on and off and also turning on the motor whenever such differential pressures reaches said predetermined value.

13. A self-cleaning barrier filter assembly according to claim 12 wherein the filter cartridge has an open interior and the motor is nested in one end of the open interior.

14. A self-cleaning barrier filter assembly according to claim 9, in which the means defining a zone of differential fluid pressure is a trough extending longitudinally along the filter cartridge with one open side facing the filter cartridge in close proximity thereto.

15. A self-cleaning barrier filter assembly according to claim 9, in which the means defining a zone of differential pressure defines a gap between it and the filter surface within the range from about 0.001 to about 0.1 inch wide for flow of pressurized unfiltered fluid upstream of the filter cartridge and outside the zone, to provide backflow from the downstream side of the filter cartridge.

* * * * *

UNITED STATES PATENT AND TRADEMARK OFFICE
CERTIFICATE OF CORRECTION

PATENT NO. : 4,482,365

DATED : November 13, 1984

INVENTOR(S) : Charles J. Roach

It is certified that error appears in the above—identified patent and that said Letters Patent is hereby corrected as shown below:

Column 5, line 39 : "niclel" should be --nickel--
Column 11, line 1 : delete ", which" and insert --;--
Column 11, line 64 : "highpressure" should be --high-pressure--

Signed and Sealed this

Eighth Day of September, 1987

Attest:

DONALD J. QUIGG

Attesting Officer          Commissioner of Patents and Trademarks